United States Patent
Parker

(10) Patent No.: US 10,368,531 B2
(45) Date of Patent: Aug. 6, 2019

(54) ANIMAL EXERCISE DEVICE FOR MOUNTING TO A VEHICLE

(71) Applicant: Julia N Parker, Charleston, SC (US)

(72) Inventor: Julia N Parker, Charleston, SC (US)

(*) Notice: Subject to any disclaimer, the term of this patent is extended or adjusted under 35 U.S.C. 154(b) by 270 days.

(21) Appl. No.: 15/582,862

(22) Filed: May 1, 2017

(65) Prior Publication Data

US 2018/0310528 A1 Nov. 1, 2018

(51) Int. Cl.
*A01K 15/02* (2006.01)
*A01K 1/04* (2006.01)
*A01K 27/00* (2006.01)

(52) U.S. Cl.
CPC .............. *A01K 15/027* (2013.01); *A01K 1/04* (2013.01); *A01K 27/003* (2013.01)

(58) Field of Classification Search
CPC .. A01K 15/027; A01K 27/003; A01K 27/002; A01K 1/04; A01K 27/00; B62J 2099/0073
USPC ................................ 119/704, 703, 771, 769
See application file for complete search history.

(56) References Cited

U.S. PATENT DOCUMENTS

| | | | | |
|---|---|---|---|---|
| 4,134,364 A | * | 1/1979 | Boncela | A01K 1/04 119/703 |
| 5,033,409 A | * | 7/1991 | Sabot | A01K 15/027 119/703 |
| 5,375,561 A | * | 12/1994 | Gundersen | A01K 1/04 119/771 |
| 5,632,233 A | * | 5/1997 | Kovach | A01K 1/04 119/771 |
| 6,237,539 B1 | | 5/2001 | Sporn | |
| 6,408,793 B1 | | 6/2002 | Rutter | |
| 6,874,448 B1 | * | 4/2005 | Fleck | A01K 1/04 119/771 |
| 7,017,526 B2 | | 3/2006 | Chen | |
| 7,726,261 B2 | | 6/2010 | Everhart | |
| 8,006,650 B2 | * | 8/2011 | Tollman | A01K 27/003 119/771 |
| 8,544,420 B2 | | 10/2013 | Leon | |
| 2009/0139463 A1 | | 6/2009 | Morrow | |
| 2012/0118245 A1 | * | 5/2012 | Leon | A01K 1/04 119/771 |
| 2014/0283759 A1 | * | 9/2014 | Bianchi | A01K 1/04 119/771 |
| 2015/0327515 A1 | * | 11/2015 | Blough | A01K 15/027 119/702 |

(Continued)

OTHER PUBLICATIONS http://www.homdox.net/product/homdox-pets-dog-leash-coupler-double-dog-walker-lead-elastic.com, 2015-2016.

*Primary Examiner* — Trinh T Nguyen
(74) *Attorney, Agent, or Firm* — B. Craig Killough; Barnwell, Whaley, Patterson & Helms

(57) ABSTRACT

An animal exercise device that is suitable for mounting to a vehicle. A flexible pole is mounted to the vehicle and extends from a side of the vehicle and away from oncoming traffic. A lead extension is connected to the flexible pole and to a coupler having a first elastic section and a second elastic section. The first section and second section act as a leash for a first animal and a second animal, respectively. The animal exercise device allows multiple animals to walk or run beside the vehicle. The device is constructed to keep the animals positioned to a side of the vehicle and away from the vehicle.

14 Claims, 4 Drawing Sheets

(56) References Cited

U.S. PATENT DOCUMENTS

2016/0165848 A1\* 6/2016 Granger ............... A01K 27/003
 119/771

\* cited by examiner

ANIMAL EXERCISE DEVICE FOR MOUNTING TO A VEHICLE

FIELD OF THE INVENTION

The present invention relates to devices and methods for exercising animals.

BACKGROUND OF THE INVENTION

For many years, people have taken their dogs and other animals for walks. Exercise for dogs and other animals is important to health and well-being. Exercise is especially important when dogs are kept inside dwellings or in small enclosed spaces.

However, due to age, infirmity, or other constraints people are unable to adequately exercise dogs by walking or jogging with the animals. In such cases, it is advantageous for a person to ride in a vehicle while the animals walk or run alongside the vehicle.

Low speed vehicles such as golf carts are seemingly appropriate for assisting in providing exercise of animals. However, there are safety concerns with using vehicles for this purpose, even when using low speed vehicles. The operator of the low speed vehicle, such as a golf cart, must pay attention to driving the vehicle and not exclusively to animal safety. Secondly, without an appropriate way to attach leashes, there is a danger that the animal will move in front of the golf cart, or otherwise interfere with travel and operation of the golf cart. If the animal being exercised strays in front of the golf cart, the golf cart may injure the animal.

There is a need for a device that will allow a low speed vehicle such as a golf cart to be used for safely exercising animals, and particularly, dogs.

SUMMARY OF THE INVENTION

The present invention is an animal exercise device that is suitable for mounting to a vehicle. A flexible pole is mounted to the vehicle and extends from a side of the vehicle and away from oncoming traffic.

A lead extension is connected to the flexible pole and to a coupler having a first elastic section and a second elastic section. The first elastic section and second elastic section act as a leash for a first animal and a second animal, respectively.

The animal exercise device allows multiple animals to walk or run beside the vehicle. The device keeps the animals positioned to a side of the vehicle and away from the vehicle.

BRIEF DRAWING DESCRIPTION

FIG. 1 demonstrates the animal exercise device mounted to a low speed vehicle such as a golf cart, with a coupler attached to harnesses for two animals.

DESCRIPTION OF PREFERRED EMBODIMENTS

Figure 1:
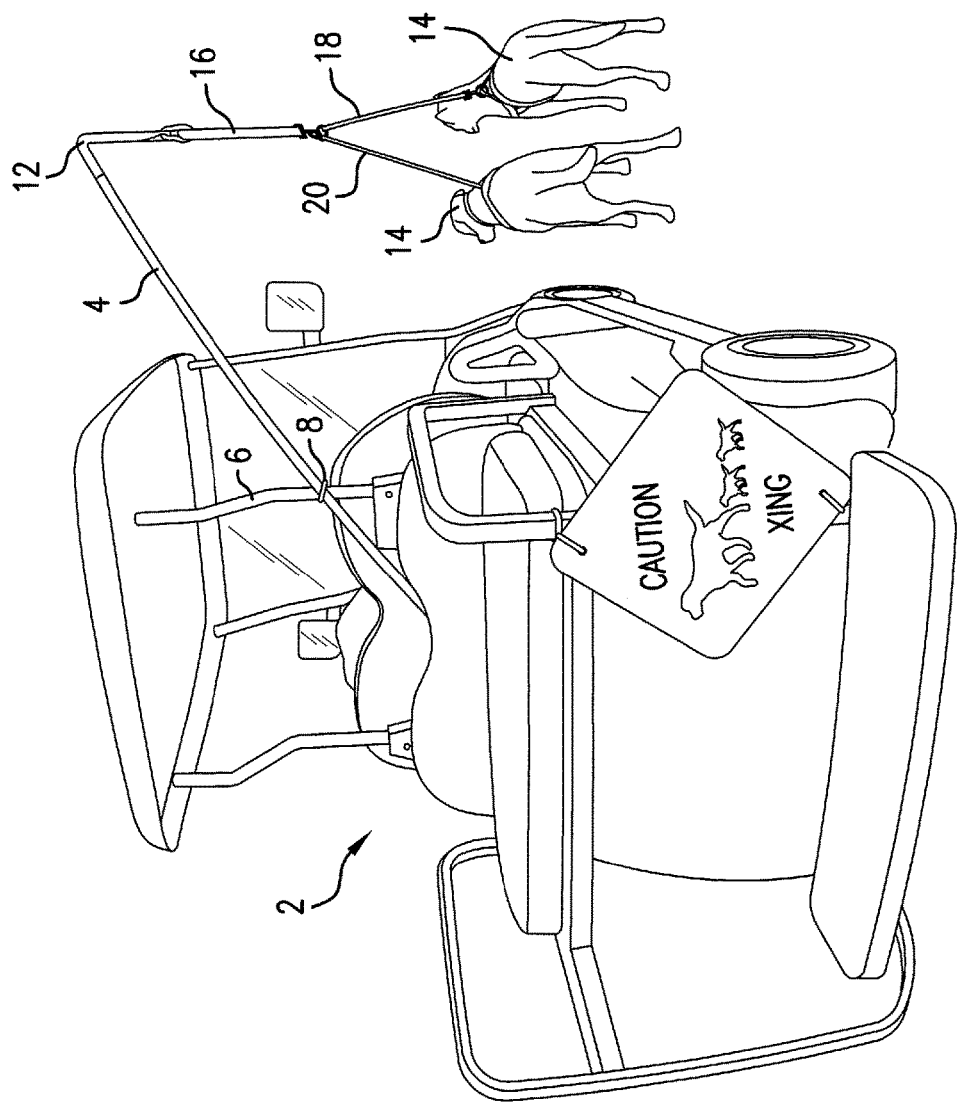
Figure 2:
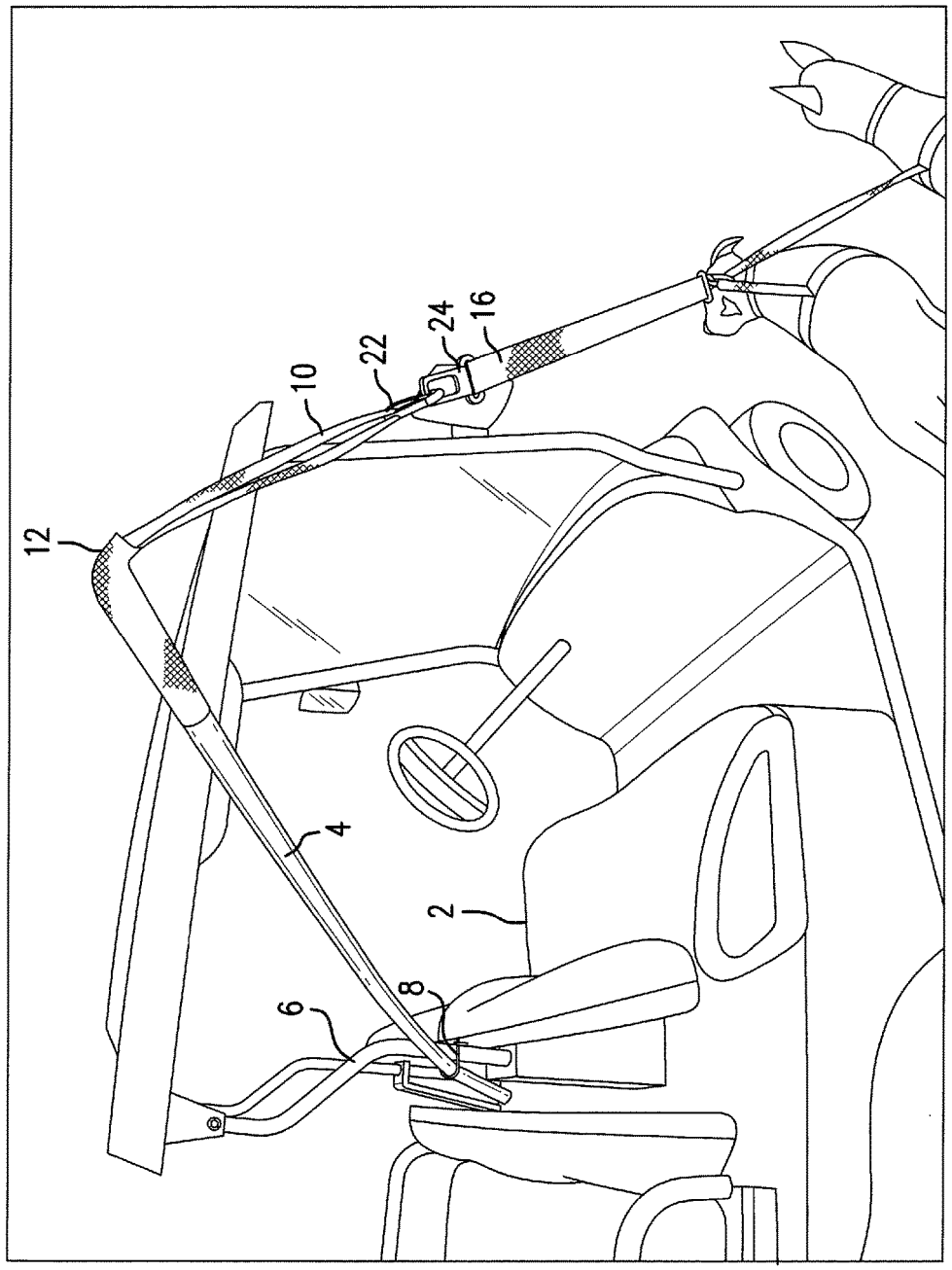
FIG. 2 is another view of the animal exercise device of FIG. 1.
Figure 3:
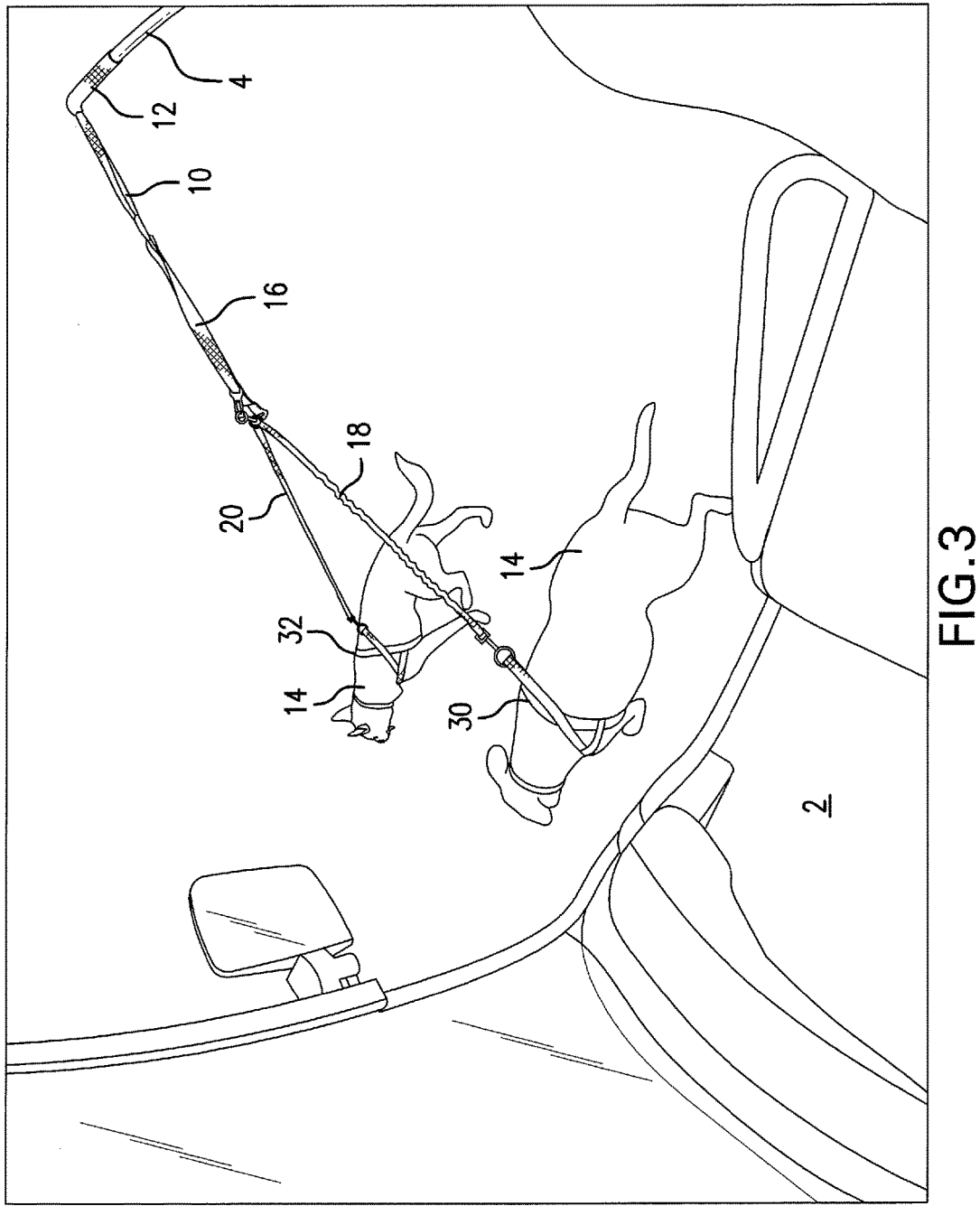
FIG. 3 is another view of the animal exercise device of FIG. 1 and FIG. 2.
Figure 4:
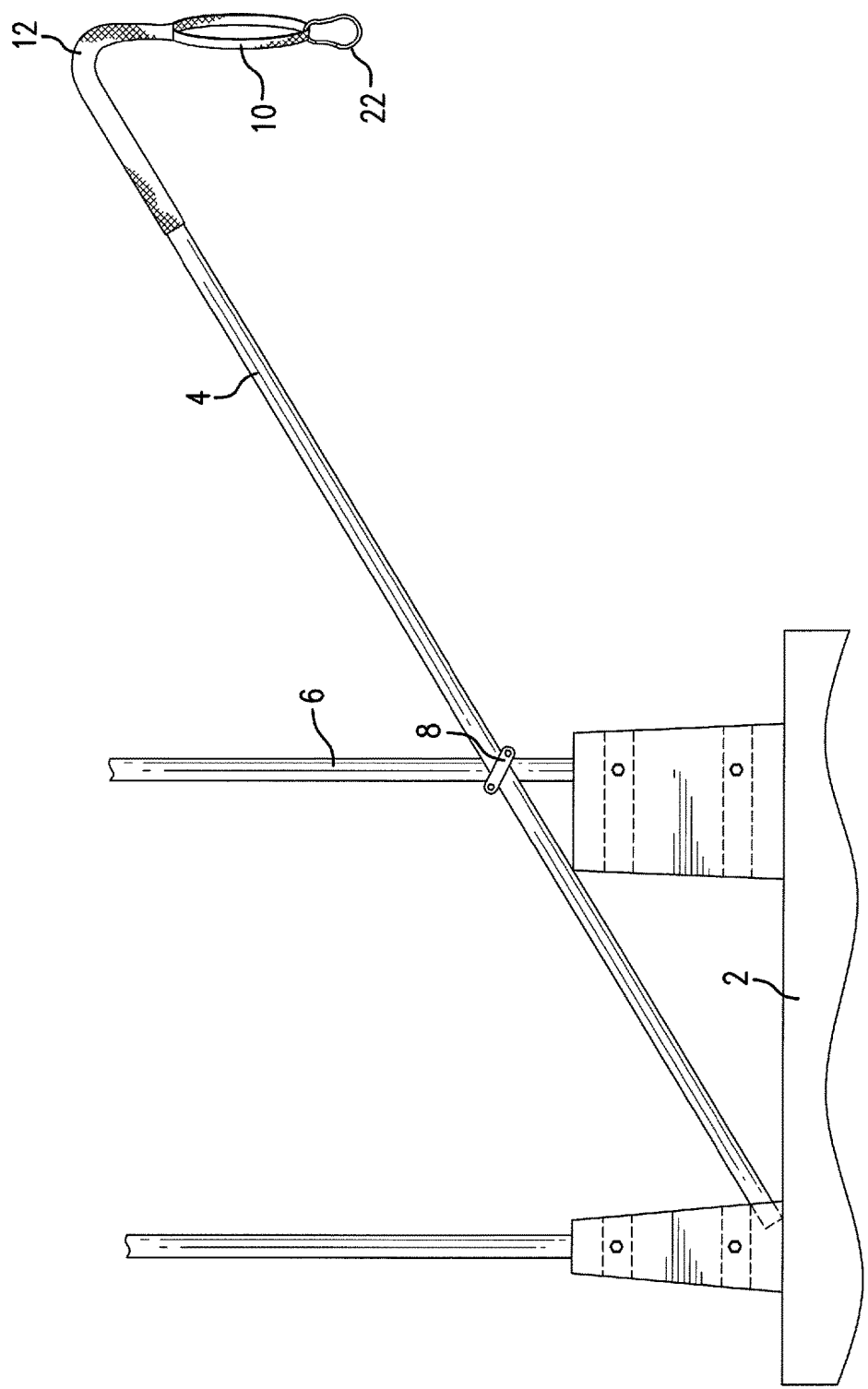
FIG. 4 is an elevation showing a flexible pole mounted to a stanchion for a vehicle roof, with the flexible pole having a covering on one end thereof that forms a loop.

Turning now to the drawing Figures, FIG. 2 shows the device according to a preferred embodiment mounted to a low speed vehicle 2. A flexible pole 4 is mounted near one end to the low speed vehicle, which may be a golf cart. The flexible pole extends outwardly from the golf cart at about 75-110° from the direction of travel of the golf cart.

In a simple embodiment, the flexible pole 4 may be attached to a stanchion 6, such as a stanchion for a roof support of a vehicle, by a mounting member 8. The mounting member may be a U-bolt that surrounds a portion of the flexible pole and a portion of the stanchion. An end of the flexible pole may rest against the body of the low speed vehicle.

The flexible pole 4 is formed of a strong, but flexible material that will return to its original shape after flexing that occurs during use. The preferred material for the flexible pole is fiberglass formed as a rod. Fiberglass rods can withstand a substantial axial force without breaking, although a fiberglass rod will bend or flex under axial force. Flexing or bending of the rod in use is desirable as the animals pull against the rod, so that some velocity differences between the animals and the vehicle are absorbed by the rod in addition to being absorbed by the elastic coupler if an elastic coupler is used. The length of the flexible pole creates a substantial moment about the mounting, which a properly designed fiberglass rod can withstand without breaking under the force exerted by the vehicle and the animals. The fiberglass pole is similar to a fishing rod that flexes but does not break. This flexing allows the animals to pull against the flexible pole and bend it so that they do not experience a sudden stop as they pull against the pole.

A loop 10 is provided at or near an end of the flexible pole that is opposite the vehicle. In a preferred embodiment, a covering 12, which may be of nylon, is shrink fitted over the end of the flexible pole that the opposite the vehicle. The loop may be formed from the covering, with nylon material having sufficient strength to withstand force applied to the loop by the animals 14 that are attached to the coupler 18,20.

The adjustable loop 10 is attached to a lead extension 16. The lead extension is a length of material for connecting the coupler to the flexible pole. The lead extension is preferred to have substantial strength and is length adjustable.

In a preferred embodiment, the lead extension 16 may be formed of nylon or polyester webbing of a type from which automotive seat belts are made. Length adjustment 24 may be provided by, for example, pulling an end of the webbing through a loop and securing an end of the loop with another loop. Other fasteners, such as hook and loop material may be used to adjust the length of the lead extension. In one embodiment, the lead extension is formed as a loop that can be adjusted in length, such as by the use of hook and loop material. A snap shackle or similar connector is attached to the lead extension, and is used to connect to a ring on the coupler. The snap shackle allows the coupler to be easily disconnected from the lead extension.

A connector 22 attached to the lead extension allows the lead extension to be connected to the loop 10, such as by use of a carabiner or other similar attachment device that allows for easy attachment and removal of the device, yet provides a secure connection. The opposite end of the lead extension similarly has a connector 26. The coupler for the animals is attached to the lead extension using the connector, such as a carabiner.

A coupler is formed in two or, perhaps three, sections 18,20. Each section is preferred to have an elastic property that allows an animal to stretch the section to which it is attached. The flexible and elastic nature of the sections allow the animals to move inwardly and outwardly relative to each other while the low speed vehicle is in motion. The sections may comprise bungee cords.

A feature of the invention is that the device restrains the animals and prevents the animals from traveling in front of the vehicle in the event that the speed or pace of the animals exceeds that of the vehicle. A distance from the end of the flexible pole opposite the vehicle to the end of both of the elastic sections to which the animals are attached does not exceed the distance from the end of the flexible pole opposite the vehicle to the front of the vehicle when then lead extension, the first elastic section and the second elastic section, are fully extended. That is, when the length adjustable lead extension is fully extended and the elastic sections of the coupler are fully stretched, the end of the elastic sections that is opposite of the flexible pole will not extend beyond the front of the vehicle.

In a preferred embodiment, the flexible pole 10 has a diameter of not less than ¾ inches. The flexible pole is also preferred to have a length of not less than five feet six inches (5.5 feet) and not greater than six feet six inches (6.5 feet). The length of the flexible pole is measured from the side of the vehicle. In most applications, this length will keep the animals from coming in contact with the side of the vehicle from which the flexible pole extends. The width of the vehicle, with the animal exercise device and animals in place, is such that the construct can operate within the 12 foot lane width specified as a minimum width for most US and State Highways.

In use, the device is mounted to a low speed vehicle such as a golf cart by an appropriate means, such as placing an end of the device against the vehicle and attaching the flexible pole to a stanchion of the vehicle. The end of the flexible pole that is opposite the vehicle is preferred to be elevated to a height of five feet six inches (5.5 feet) to six feet above the roadway. The lead extension 16 is securely attached to the flexible pole 4, such as by attachment to the loop 10. The opposite end of the lead extension is attached to the coupler 18,20, making sure that the coupler is secure.

The end of the first section 18 is attached to a collar, or preferably, a harness 30 for a first animal and the second section 20 of the coupler is attached to a collar or harness 32 of the second animal. It is verified that the length of the lead extension and the couplers are such that the animals that are restrained and connected to the vehicle cannot venture in front of the vehicle. The vehicle may now be operated so as to walk or run the animals as appropriate to the animals.

What is claimed:

1. An animal exercise devices for mounting to a vehicle, comprising:
    a) a flexible pole comprising a vehicle mount;
    b) a lead extension connected to the flexible pole near an end of the flexible pole, wherein the lead extension is length adjustable;
    c) a coupler having a first section and a second section, wherein the coupler is mounted to the lead extension and opposite the flexible pole; and wherein, in use, with animals attached to the first section of the coupler and the second section of the coupler, neither a horizontal distance from the end of the flexible pole to an end of the first section of the coupler that is opposite the lead extension nor a horizontal distance from the end of the flexible pole to an end of the second section of the coupler that is opposite the lead extension exceeds a horizontal distance from the end of the flexible pole to a front of a vehicle to which the flexible pole is mounted when the lead extension, the first section and the second section are fully extended.

2. An animal exercise device as described in claim 1, wherein the vehicle mount is connected to a golf cart.

3. An animal exercise device as described in claim 1, wherein the vehicle mount is connected to a roof support of a vehicle.

4. An animal exercise device as described in claim 1, wherein the flexible pole comprises a loop on the end of the flexible pole, and the lead extension is connected to the loop.

5. An animal exercise device as described in claim 1, wherein the flexible pole comprises a covering for the flexible pole and the covering comprises a loop, and the lead extension is connected to the loop.

6. An animal exercise device as described in claim 1, wherein the flexible pole comprises a covering for the flexible pole and the covering comprises a loop that extends past the end of the flexible pole, and the lead extension is connected to the loop.

7. An animal exercise device as described in claim 1, wherein the flexible pole comprises a covering for the flexible pole and the covering forms a loop that extends past the end of the flexible pole, and the lead extension is connected to the loop.

8. An animal exercise device as described in claim 1, wherein the flexible pole is a fiberglass pole.

9. An animal exercise device as described in claim 8, wherein the flexible pole comprises a covering for the flexible pole and the covering forms a loop that extends past the end of the flexible pole, and the lead extension is connected to the loop.

10. An animal exercise device as described in claim 1, wherein the flexible pole extends at generally a right angle to a direction of travel of a vehicle to which the flexible pole is mounted.

11. An animal exercise device as described in claim 1, wherein the first section of the coupler comprises an elastic material.

12. An animal exercise device as described in claim 1, wherein the first section of the coupler is a bungee cord.

13. An animal exercise device as described in claim 1, wherein the flexible pole at the point of attachment of the flexible pole to the lead extension is not less than five (5.0) feet above a surface upon which a vehicle to which the flexible pole is mounted travels.

14. An animal exercise device as described in claim 1, wherein the flexible pole extends not less than five and one half (5.5) feet from a side of a vehicle to which the flexible pole is mounted.

* * * * *